(12) United States Patent
Skinner

(10) Patent No.: US 10,136,577 B2
(45) Date of Patent: Nov. 27, 2018

(54) FIXED-LINE TRIMMER HEAD WITH IMPROVED LINE CHANNEL

(71) Applicant: Shakespeare Company, LLC, Columbia, SC (US)

(72) Inventor: David B. Skinner, Columbia, SC (US)

(73) Assignee: Shakespeare Company, LLC, Atlanta, GA (US)

( * ) Notice: Subject to any disclaimer, the term of this patent is extended or adjusted under 35 U.S.C. 154(b) by 340 days.

(21) Appl. No.: 14/680,411

(22) Filed: Apr. 7, 2015

(65) Prior Publication Data

US 2015/0282425 A1    Oct. 8, 2015

Related U.S. Application Data

(60) Provisional application No. 61/976,222, filed on Apr. 7, 2014.

(51) Int. Cl.
*A01D 34/416*    (2006.01)

(52) U.S. Cl.
CPC ....... *A01D 34/4166* (2013.01); *A01D 34/416* (2013.01); *Y10T 29/49826* (2015.01)

(58) Field of Classification Search
CPC .............. A01D 34/416; A01D 34/4166; A01D 34/4168
USPC .................................................. 30/247, 347
See application file for complete search history.

(56) References Cited

U.S. PATENT DOCUMENTS

| | | | |
|---|---|---|---|
| 4,086,700 A * | 5/1978 | Inada ................. | A01D 34/4166 30/276 |
| 5,758,424 A | 6/1998 | Iacona et al. | |
| 5,896,666 A | 4/1999 | Iacona et al. | |
| 6,347,455 B2 | 2/2002 | Brant et al. | |
| 6,401,344 B1 | 6/2002 | Moore et al. | |
| 6,581,292 B2 | 6/2003 | Allis | |
| 7,000,324 B2 * | 2/2006 | Fogle .................. | A01D 34/416 30/276 |
| 7,111,403 B2 | 9/2006 | Moore | |
| 8,307,558 B2 | 11/2012 | Alliss | |
| 8,341,847 B2 * | 1/2013 | Kato .................... | A01D 34/416 30/276 |
| 2008/0271424 A1 | 11/2008 | Alliss | |

FOREIGN PATENT DOCUMENTS

JP    2012023962 A *    2/2012    ......... A01D 34/4166

* cited by examiner

*Primary Examiner* — Laura M Lee
(74) *Attorney, Agent, or Firm* — Eversheds Sutherland (US) LLP

(57) ABSTRACT

Fixed-line trimmer heads for rotary trimmer devices and associated methods are provided. A fixed-line trimmer head for a rotary trimmer device includes a housing operatively attachable to the rotary trimmer device. The housing is rotatable when in use around a central axis of rotation and has a top surface extending outwardly from the central axis and facing upward when in use, a bottom surface extending outwardly from the central axis and facing the ground when in use, and a periphery connecting the top surface to the bottom surface. At least one line channel is defined within the housing of the trimmer head having an entrance recessed within the periphery and an exit disposed on one of the top and bottom surfaces, wherein the entrance and exit are each located an equal distance from the axis of rotation.

12 Claims, 18 Drawing Sheets

FIXED-LINE TRIMMER HEAD WITH IMPROVED LINE CHANNEL

CROSS-REFERENCE TO RELATED APPLICATION

This application claims the benefit of U.S. Provisional Patent Application No. 61/976,222, filed Apr. 7, 2014, the entirety of which is incorporated herein by reference.

FIELD OF INVENTION

The present invention relates generally to line-type vegetation trimmer heads for rotary trimmers and, more particularly, to rotary trimmer heads known as "fixed line" trimmer heads. Specifically, the present invention relates to a fixed-line trimmer head having a line-holding mechanism that can be loaded from the perimeter of the head and discharged from another position on the head and yet will not allow any significant amount of debris and dirt to be drawn into the head.

BACKGROUND

Vegetation trimming devices are well known and are commonly used to maintain one's lawn and garden. There are a number of different classifications of rotary trimmer heads, defined generally by the manner in which a monofilament trimmer line is fed, spooled or replaced in the trimmer head and/or how the trimmer line is discharged, indexed or lengthened during use of the trimmer head. Such classifications include (a) "self-indexing" trimmer heads, wherein trimmer line is automatically released from a spool inside the trimmer head upon a determination of increased rotational speed of the trimmer head, (b) "bump-fed" or "bump-activated" trimmer heads, wherein trimmer line is mechanically released from a spool inside the trimmer head by the user "bumping" the bump knob or similar member on the ground so as to permit a length of line to be released, and (c) "fixed-line" trimmer heads, wherein a length of line is introduced and inserted manually through spaced openings at the periphery of the trimmer head into a line-holding mechanism that holds the trimmer line to the trimmer head during use, eliminating the need for a spool.

The majority of aftermarket trimmer heads sold are (c) "fixed-line" trimmer heads because they are easily designed to be universally adaptable to essentially any brand of rotary trimmer regardless of the operation of the trimmer head or the direction of rotation. Replacement strips of trimmer line used for this type of trimmer head are typically about 8 to 15 inch in length and can be easily added to the head through the openings. More particularly, fixed-line heads use a base portion having a series of radially spaced line holders, each capable of holding one strip of trimmer line. After the line strip wears, the consumer manually removes the used strip, either through the openings, if possible, or more likely, through a discharge port located near the radial center of and on the top or bottom of the trimmer head. Once the old worn length of line is removed, a new length of trimmer line can be inserted into the line holding mechanism. There is no indexing or lengthening of the line during use. The ease-of-use has been a reason for the market acceptance of this type trimmer head. However, the need for improvement still exists for this type of trimmer head.

There are a variety of methods and mechanisms developed and discussed in the prior art for holding a fixed length of trimmer line to a trimmer head. Among the more popular methods for holding strips of line include (i) means for holding one end of a strip of line such that one end is held by the trimmer head, while the other end impacts and cuts vegetation, (ii) means for holding a folded strip of line such that one and typically both ends of the strip of line impacts or cuts vegetation, or (iii) means for holding the strip of line in the middle such that both distal ends extend from the trimmer head for impacting and cutting vegetation. Since the present invention is focused on improving fixed-line trimmer heads that hold only one end of each line strip, the prior art and problems associated with these line-holding mechanisms are further discussed.

U.S. Pat. Nos. 5,758,424 and 5,896,666 describe the use of a single biased pivoting cam adjacent to a pressing wall, whereby the trimmer line is pinched between the cam and the pressing wall. With these clamping concepts, line can be inserted and removed when the line moves in one direction, but the line cannot move in the opposite direction.

Similarly, U.S. Pat. No. 6,581,292 teaches the use of a sliding cleat. The cleat is bias to a first position as to cause the cleat to touch the far wall of a line channel. A strip of trimmer line can be inserted into the line channel, which causes the cleat to move to a second position and allows a portion of the line to pass into the line channel and partially past the cleat. The line can be inserted and moved in one direction, but cannot be removed if pulled in the opposite direction, unless pulled with significant force.

Another means of holding a fixed length of line is taught by U.S. Pat. No. 6,347,455. In this patent, pairs of cams are used to grip the line. In the '455 patent, the cams are not biased, but operatively connected to an actuator. The actuator is biased. Each actuator is biased such that a pair of cams are forced together to form a pinch point. A fixed length of trimmer line can be inserted between the two cams in one direction, but cannot be removed if pulled in the opposite direction.

While not discussed in some of these patents, the early commercialized fixed-line trimmer heads based upon the above discussed clamping means for holding trimmer line all had one thing in common. These heads all had a lower central cavity defined within the housing of the trimmer head that was open to the lower side of the trimmer head and a straight line channel that extended from an opening on the outer perimeter of the trimmer head to an opposite opening located on the inside perimeter of the trimmer head defined by this lower central cavity. The line channels were all straight and positioned essentially radially and perpendicular to the axis of rotation. This configuration allowed the user to insert the line from the outside perimeter of the head. One distal end of the line would be left extending from the trimmer head for the purpose of contacting and cutting the vegetation upon rotation of the head, while the other distal end of the line would extend past the clamp and into this lower central cavity. This allowed the user to later grab the end extending into the lower central cavity for the purpose of removing the line when the time arose to install a new strip of line into the trimmer head.

A common problem with the line channel configurations discussed above is that dirt and debris would enter the line channel(s) from the opening(s) along the lower central cavity and would travel along the line channel(s) towards the outer opening(s) located on the perimeter of the trimmer head. This would occur even with line installed in the line channel. Without being bound to theory, it is believed this problem is caused due to the construction of the trimmer head wherein a vacuum is created during the high speed rotation of the trimmer head such that dirt and debris are sucked into the trimmer head openings, particularly the openings in the trimmer head long the lower central cavity.

It has been found that this dirt and debris traveling along the line channel to the inside of the head would often collect around the clamp and eventually would interfere with the movement of the pivoting or reciprocating clamps. Such debris can cause the clamping means to stop functioning. This problem has been the source of much frustration among users of this type of fixed-line trimmer head.

After extended use, the commercial trimmer heads of the types taught in U.S. Pat. Nos. 5,758,424, 5,896,666 and 6,581,292 will sometimes fail by not releasing the line or by no longer gripping the line. This generally happens due to the clamp becoming stuck due to debris which has collected inside the trimmer head. The trimmer heads taught by U.S. Pat. No. 6,347,455 are unique in that an actuator could be used to open the pinch point between the dual-facing clamps. However, eventually enough debris can collect in trimmer heads of even this design and prevent the actuator from being able to move the clamps.

Attempts have been made to counter this problem. In U.S. Patent Application Publication Nos. US 2008/0271424 and US 2008/0083120, the line channel extends from the outer perimeter of the head to a point located on the upper surface of the trimmer head, as opposed to the lower central cavity of the other line channel designs. However, upon analysis of trimmer heads having this line channel configuration, it has been determined that simply locating the second opening for the line outlet on the upper surface of the head does not solve the problem of dirt and debris being pulled into the head. And, these two later approaches do not provide a means such as an actuator to open the pinch point as was taught by U.S. Pat. No. 6,347,455.

Thus, the need exists for an improved fixed-line trimmer head of the type capable of holding at least one strip of line such that one end of the strip of line is held by the trimmer head, while the other end impacts and cuts vegetation. Such a trimmer head should have a line-holding mechanism that can be loaded from the perimeter of the head and discharged from another position on the head and yet will not allow any significant amount of debris and dirt to be drawn into the head.

Another challenge with any fixed-line trimmer head is gripping the line sufficiently tight enough so that the line is not pulled from the head when impacting objects like fences, posts and rocks, and yet capable of releasing the line when the times comes to replace the line. Keeping dirt and debris out of the head is important if the head is to continue to function by allowing the clamps to grip and release the line.

SUMMARY OF THE INVENTION

At least one or more of the foregoing aspects of the present invention, together with the advantages thereof over the known art relating to fixed-line trimmer heads, which shall become apparent from the specification and drawings that follows, may be accomplished by the invention as hereinafter described and claimed Generally, and as noted above, the present invention relates to a fixed-line type of trimmer head of the type capable of holding at least one strip of line, wherein one end of the strip of line is held by the trimmer head, while the other end impacts and cuts vegetation. In other words, fixed-line trimmer heads having means for holding a strip of line in the middle such that both distal ends extend from the trimmer head for impacting and cutting vegetation is not a part of this invention as will be more particularly made clear below.

One aspect of this invention may be achieved by a fixed-line trimmer head for a rotary trimmer device, wherein the trimmer head comprises a housing operatively attachable to the rotary trimmer device. The housing is rotatable when in use around a central axis of rotation. The housing may include a top surface extending outwardly from the central axis and facing upward when in use, and a bottom surface extending outwardly from the central axis and facing the ground when in use. A periphery connects the top surface to the bottom surface. With housing of the trimmer head is at least one line channel, each channel includes an entrance recessed within the periphery and an exit disposed on one of the top and bottom surfaces. Most notably, the entrance and the exit are each located an equal distance from the axis of rotation.

It will be appreciated that the entrance of each line channel is located within a recess at the periphery, and as such, a plane that contains the entrance will, therefore, often be generally or substantially parallel to the central axis of rotation of the trimmer head, while the exit of each line channel is located on either the top surface or bottom surface of the housing and, as such and as opposed to the plane containing the entrance, a plane containing the exit will often be generally or substantially orthogonal or perpendicular to the central axis of rotation of the trimmer head. Thus, by "an equal distance from the axis of rotation," it is meant that, if any distance within a range as measured from the central axis of rotation to any portion of the entrance, i.e., from its closest point to the central axis of rotation to its farthest point to the central axis of rotation is equal to any distance within a range as measured from the central axis of rotation to any portion of the exit, i.e., from its closest point to the central axis of rotation to its farthest point to the central axis of rotation, then the entrance and the exit are an equal distance from the central axis of rotation. Any overlap of these ranges will be seen as an equal distance for the purposes herein. Thus, for example, if the closest point from the entrance to the axis of rotation is 4.1 inches, and the farthest point from the entrance to the axis of rotation is 4.3 inches, the range of distance for the entrance is 4.1 to 4.3 inches. If the closest point from the exit to the axis of rotation is 3.8 inches, and the farthest point from the exit to the axis of rotation is 4.2 inches, then the range of distance for the exit is 3.8 to 4.2. Because there is an overlap of these ranges (4.1 to 4.2), the entrance and exit are determined to be equal distance from the axis of rotation.

In one or more embodiments of this invention, the fixed-line trimmer head above may further comprise a pair of opposed clamps positioned in operative contact with the at least one line channel, each clamp having a gripping portion. Notably, the clamps are movable between a first position, wherein the gripping portion of each clamp interfaces with the gripping portion of the other clamp within the line channel, and a second position, wherein the gripping members are moved away from each other such that the gripping portions of each clamp do not interface with each other within the at least one line channel. In at least one embodiment, the pair of opposed clamps are pivotable between the first position and the second position.

In the same or different embodiments, the fixed-line trimmer head above may include actuator for each pair of opposed clamps, wherein the pair of opposed clamps are operatively connected to an actuator. In at least one embodiment, the actuator is movable between a first setting, wherein the pair of opposed clamps are disposed in the first position, and a second setting, wherein the pair of opposed clamps are disposed in the second position, In at least one embodiment, the actuator is biased to maintain the first setting unless acted upon.

In one or more embodiments, the entrance at one end of the at least one line channel includes an entrance port for receiving a length of trimmer line into the at least one channel, while the exit at the other end of the at least one line channel includes an exit port for removing any remaining worn length of trimmer line after use. Thus, it will be appreciated that, in at least one embodiment, the pair of opposed clamps within the at least one line channel holds the trimmer line that has passes through the at least one line channel from the entrance port to the exit port, such that when the actuator is in the first setting and the clamps are in the first position, the trimmer line may pass through the at least one line channel in the direction from the entrance port to the exit port, but may not reverse direction. But when the actuator is in the second setting and the clamps are in the second position, the trimmer line may pass through the at least one line channel in either direction.

Another aspect of the present invention may be achieved by a method for holding a fixed length of trimmer line having first and second ends to a fixed-line trimmer head of a rotary trimmer device during rotation for cutting vegetation. Such a method comprises, as a first step, providing a housing operatively attachable to the rotary trimmer device, the housing being rotatable when in use around a central axis of rotation and having a top surface extending outwardly from the central axis and facing upward when in use, a bottom surface extending outwardly from the central axis and facing the ground when in use, and a periphery connecting the top surface to the bottom surface. The method further includes inserting the first end of the trimmer line into an entrance to a line channel defined within the housing, the entrance being recessed within the periphery and passing the trimmer line through the line channel and through a pair of opposed clamps for holding the trimmer line within the line channel. The method includes removing an amount of the first end of trimmer line through an exit disposed on one of the top and bottom surfaces sufficient to pull any remaining worn length of line from the line channel upon use, wherein the entrance and the exit are an equal distance from the central axis of rotation. Finally, the method includes holding the trimmer line within the line channel with the pair of opposed clamps under sufficient force to enable the second end of the length of line that remains outside the entrance and the periphery of the housing to cut vegetation during rotation of the trimmer head.

In one or more embodiments of this invention, each clamp of the pair of opposed clamps may have a gripping portion such that the step of passing the trimmer line through the line channel includes the step of allowing the trimmer line to pass through an interface of the gripping portions of the pair of opposed clamps in one direction from the entrance to the exit, but not in the reverse direction. In at least one embodiment, the trimmer head includes a actuator external of the housing that is operatively connected to the pair of opposed clamps. Thus, it will be appreciated that one or more embodiments for the step of passing the trimmer line through the line channel of the present invention also includes actuating the actuator external of the housing to move the gripping portions of the pair of opposed clamps away from the line channel so as to allow the trimmer line to pass through the line channel is both directions. In one or more further embodiments, the step of actuating may further include the step of biasing the actuator to a setting that allows the trimmer line to pass through an interface of the gripping portions of the pair of opposed clamps in one direction from the entrance to the exit, but not in the reverse direction.

A further aspect of the present invention may be achieved by a method for preventing debris from entering a line channel of a fixed-line trimmer head of a rotary trimmer device. The trimmer head has a housing operatively attachable to the rotary trimmer device, wherein the housing is rotatable when in use around a central axis of rotation and having a top surface extending outwardly from the central axis and facing upward when in use, a bottom surface extending outwardly from the central axis and facing the ground when in use, a periphery connecting the top surface to the bottom surface, and the line channel defined within the housing of the trimmer head having an entrance recessed within the periphery and an exit disposed on one of the top and bottom surfaces. The method includes maintaining the entrance and the exit of the line channel such that both are located an equal distance from the axis of rotation.

Advantageously, the present invention can provide a fixed-line trimmer head with a line-holding mechanism that can be loaded through a recessed opening near the perimeter of the trimmer head and discharged from another position on the top or bottom of the trimmer head and yet will not allow any significant amount of dirt and debris to be drawn into the trimmer head. This is possible because the entrance recessed within the periphery of the trimmer head housing and exit in the top or bottom of the trimmer line housing are essentially of equal distance from the axial center of the trimmer head. Because of the equal distance from the axial center to the entrance and exit ports, it has been found that air is not pumped into the line channel(s) of the trimmer head and thus, do not cause debris to be vacuumed into the line channel.

It is believed further advantageous to provide a fixed-line trimmer head wherein the line-holding mechanism includes a pair of clamps located inside the head that can be moved or pivoted away from the line channel using an actuator accessible from the external surface of the trimmer head. As debris will not enter and collect in the head through the line channel(s), debris is not likely to interfere with the function of the clamps and the actuator.

It is also believed to be advantageous to provide a trimmer head designed to hold a strip of trimmer line for each line channel provided in the trimmer head, wherein the trimmer head is provided with one or more such line channels. Moreover, by using the pairs of interfacing opposed clamps, it is believed advantageous to be able to hold the trimmer line at the central axis of the line channel, rather than against one wall. The design of the opposed claims are such that they are able to hold the strips of trimmer line with much greater strength compared to commercially available trimmer heads utilizing a single cam or cleat, but yet the pair of interfacing, opposed clamps can be easily opened using an actuator or by pulling on the non-cutting end of the strip of trimmer line through the exit.

Still further, the trimmer head of the present invention is seen as advantageous in that it is believed to be capable of holding any diameter or shape of trimmer line between 50 and 155 mils, with a clamping means able to withstand a pulling force greater than 30 lbs, and in some embodiments, greater than 50 lbs.

For a fuller understanding of the nature and advantages of the present invention, reference should be made to the ensuing detailed description and accompanying drawings.

DETAILED DESCRIPTION

Figure 1:
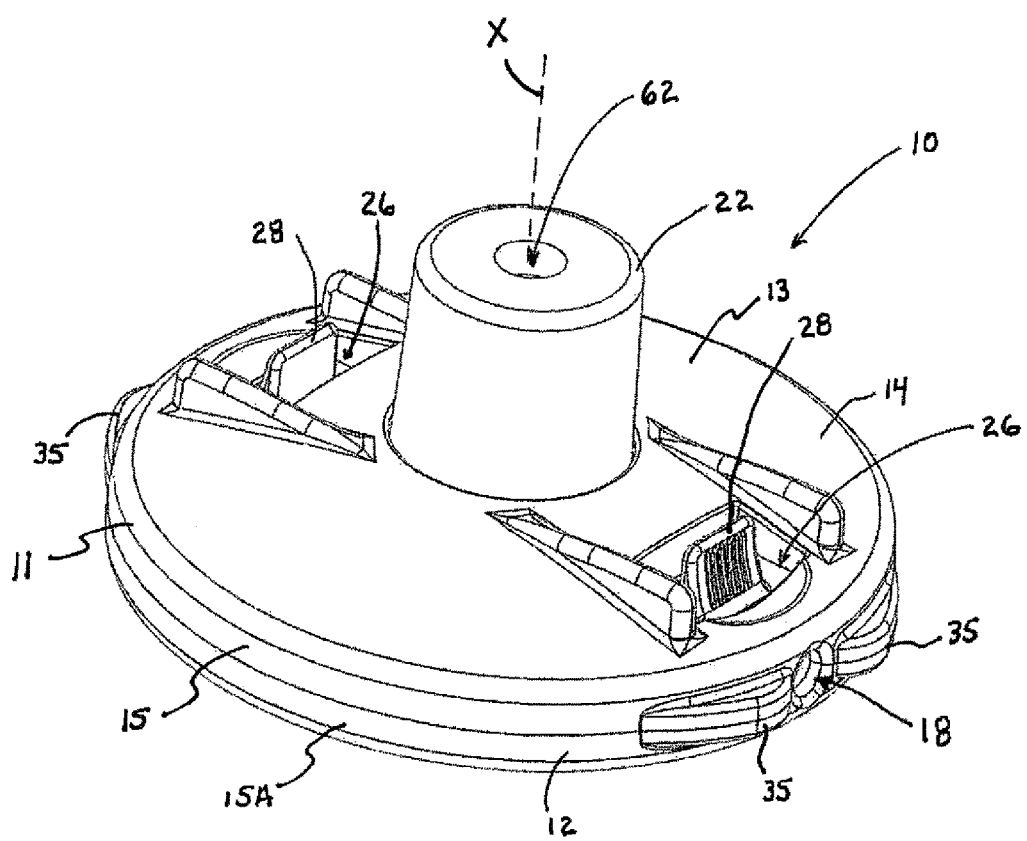
FIG. 1 shows a top perspective view of an embodiment of a trimmer head modified relative to the prior art found in U.S. Pat. No. 6,347,455 ("Brant")
Figure 2:
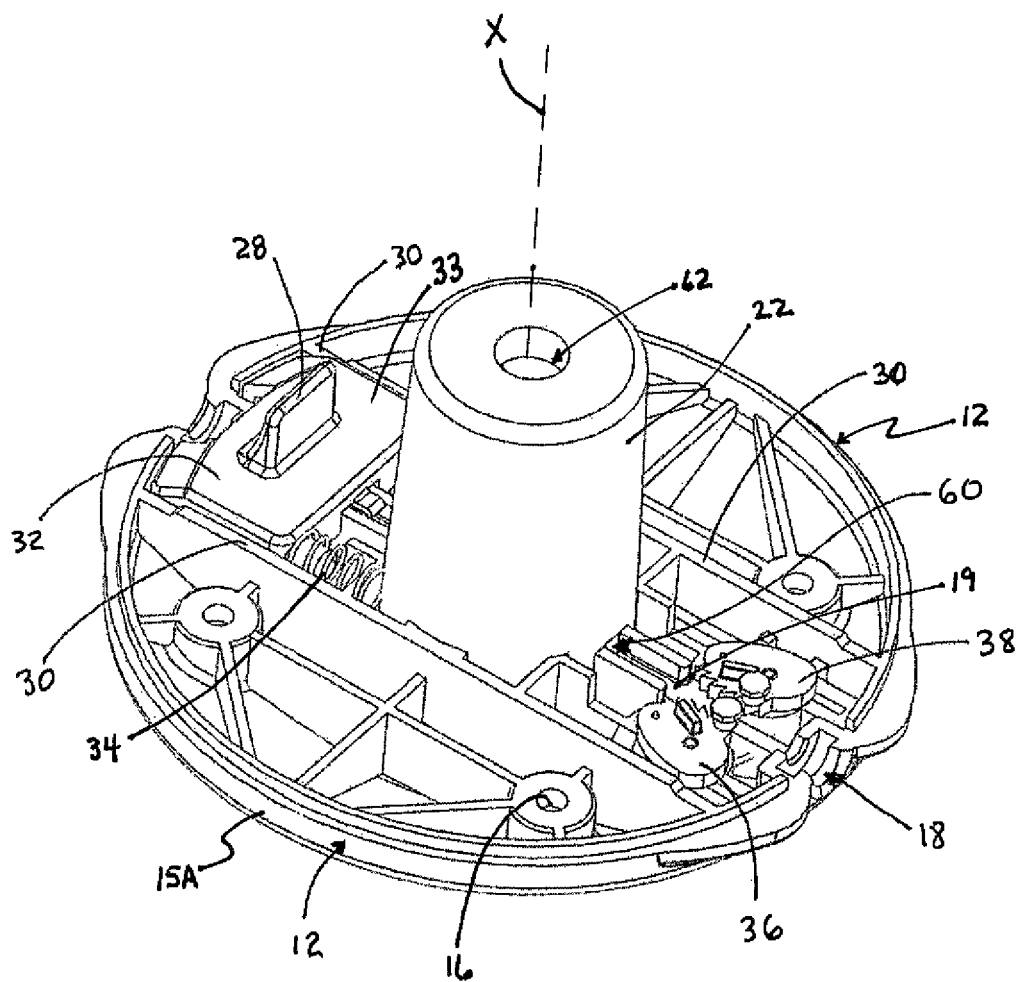
FIG. 2 is the same view as FIG. 1, but showing the base with the cover removed and one of the actuators and two springs removed from the modified trimmer head shown in FIG. 1.
Figure 3:
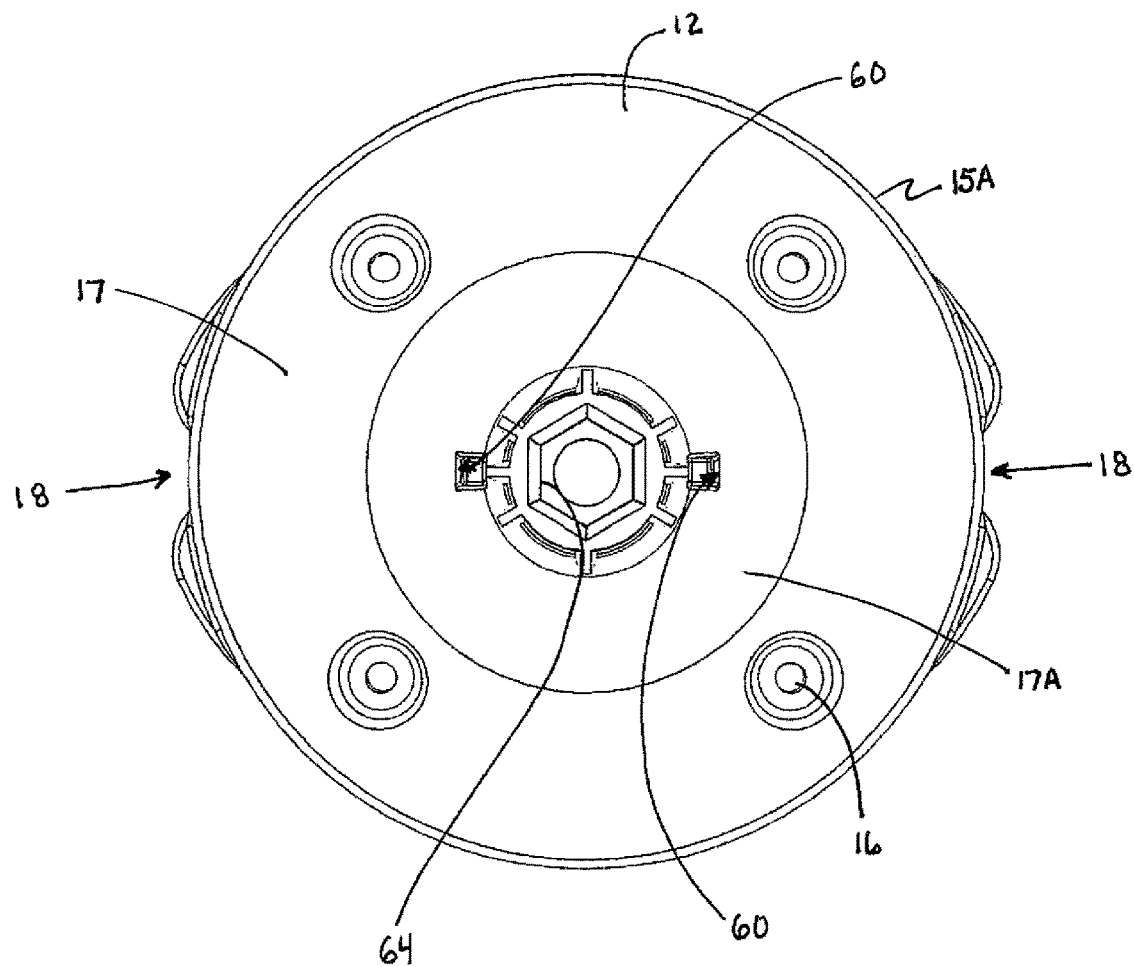
FIG. 3 is a bottom view of the modified trimmer head shown in FIG. 1.

As noted above, the trimmer head of the present invention is noted to be a "fixed-line" trimmer head of the type capable of holding at least one strip of trimmer line, wherein one end of the strip of trimmer line is held by the trimmer head (and does not cut vegetation), while the other end impacts and cuts vegetation. As such, the trimmer head of the present invention is believed to be a significant improvement over the trimmer head disclosed and taught by Brant et al., in U.S. Pat. No. 6,347,455 (hereinafter "Brant"), the disclosure of which is incorporated herein by reference.

In order to provide a full understanding of the present invention, it is believed necessary to provide an evaluation of the concepts disclosed in the Brant. Therefore, a trimmer head representing the prior art as taught by Brant with a few modifications and referred to generally by the numeral 10 in FIG. 1 was built. Most of the components of the trimmer head 10 in FIGS. 1-4 have been numbered to be identical to the numbers assigned by Brant in his patent and can be identified by referring to the specification supplied by Brant (hereby incorporated by reference). This trimmer head and its features, as shown in FIGS. 1-4, have been used for cutting vegetation and its concepts evaluated.

The trimmer head 10 includes a housing 11 defined by a base 12 and a cover 14, both of which extend radially outward from a center axis of rotation identified by the broken line X. As shown best in FIG. 1, the cover 14 includes a top surface 13 that faces upward when the trimmer head 10 is in use and that extends outwardly to a downward turning periphery 15 at the perimeter of the housing 11. The base 12 includes a bottom surface 17 that extends outwardly and downwardly for a portion, shown in FIG. 3 as recessed cavity 17A, and then extends outwardly and faces the ground when the trimmer head 10 is in use and that extends outwardly to an upward turning periphery 15A at the perimeter of the housing 11, such that the downward turning periphery 15 of the cover 14 and the upward turning periphery 15A of the base 12 are operatively connected to complete the outer shell of the housing 11. As best seen in the base 12 of FIGS. 2 and 3, it will appreciated that the base 12 and cover 14 may be held together by a plurality of fasteners (not shown) received through apertures 16 spaced apart for holding the base 12 to the cover 14.

Among the modifications made to the Brant trimmer head for this initial evaluation was that the hub 22 was modified to allow the trimmer head 10 to be attached to a trimmer device (not shown) utilizing conventional means, i.e., the central threaded stem on a trimmer device is passed through the central opening 62 in axial alignment with the axis of rotation (X) for the trimmer head and connected to a fastener (not shown). As common on aftermarket trimmer heads, a hexagon-shaped cavity 64 (FIG. 3) was added to the lower side of the base 12 for receiving the fastener. Further, compared to Brant's design that provided four line entrances, this trimmer head 10 was modified to have only two trimmer line entrances 18 located within the periphery 15, 15A of the base 12 and cover 14 at the perimeter of the housing 11.

Like Brant, each line entrance 18 included a separate line channel 19 that extended radially inward past a pair of clamps (36, 38) and then to an exit or discharge port 60. Brant had positioned the discharge port 60 such that the trimmer line would exit through the bottom surface 17 of the base 12 of the trimmer head 10, between the clamps and the central axis of rotation X of the trimmer head 10. Brant's placement of the discharge port was anticipated by him as being problematic because dirt would fill the discharge port 60 if the trimmer head 10 impacted the ground during rotation. Accordingly, the trimmer head 10 shown in FIGS. 1-3 was modified such that the discharge ports 60 were placed on the inside perimeter of the recessed cavity 17A, which leads to the hexagon cavity 64 (see FIG. 3). This placement of the discharge port 10 is typical of commercial trimmer heads based upon other patents as well.

Further modifications and improvements to Brant's trimmer head include the shape of the clamps (36, 38) and number and size of the teeth on the clamps, but the general function of the clamping mechanism, that is, using a pair of opposed clamps to hold a trimmer line within the central axis (not labeled) of the line channel, remained that provided by Brant's design. Notably, however, early attempts to design the teeth on the mating faces of the clamps were not successful with regards to holding a full range of line sizes (50 to 155 mils). Therefore, improvements had to be made to the clamps 36, 38. The clamps 36, 38, were modified from Brant to include four to six teeth, with five teeth being found to work best for the clamps designed.

Figure 4:
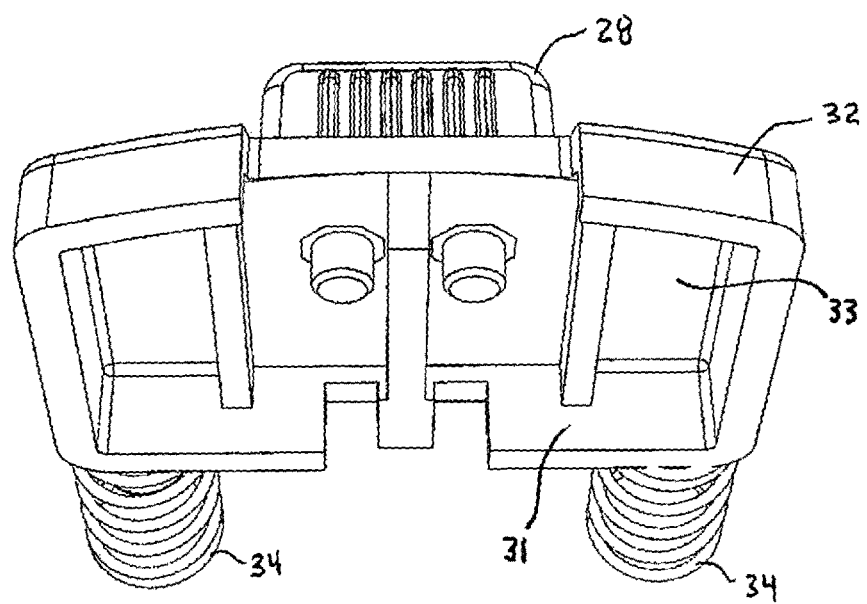
FIG. 4 is a bottom view of the actuator used in FIG. 2, with rollers installed and springs attached, as used with the modified trimmer head in FIG. 1.
Figure 5:
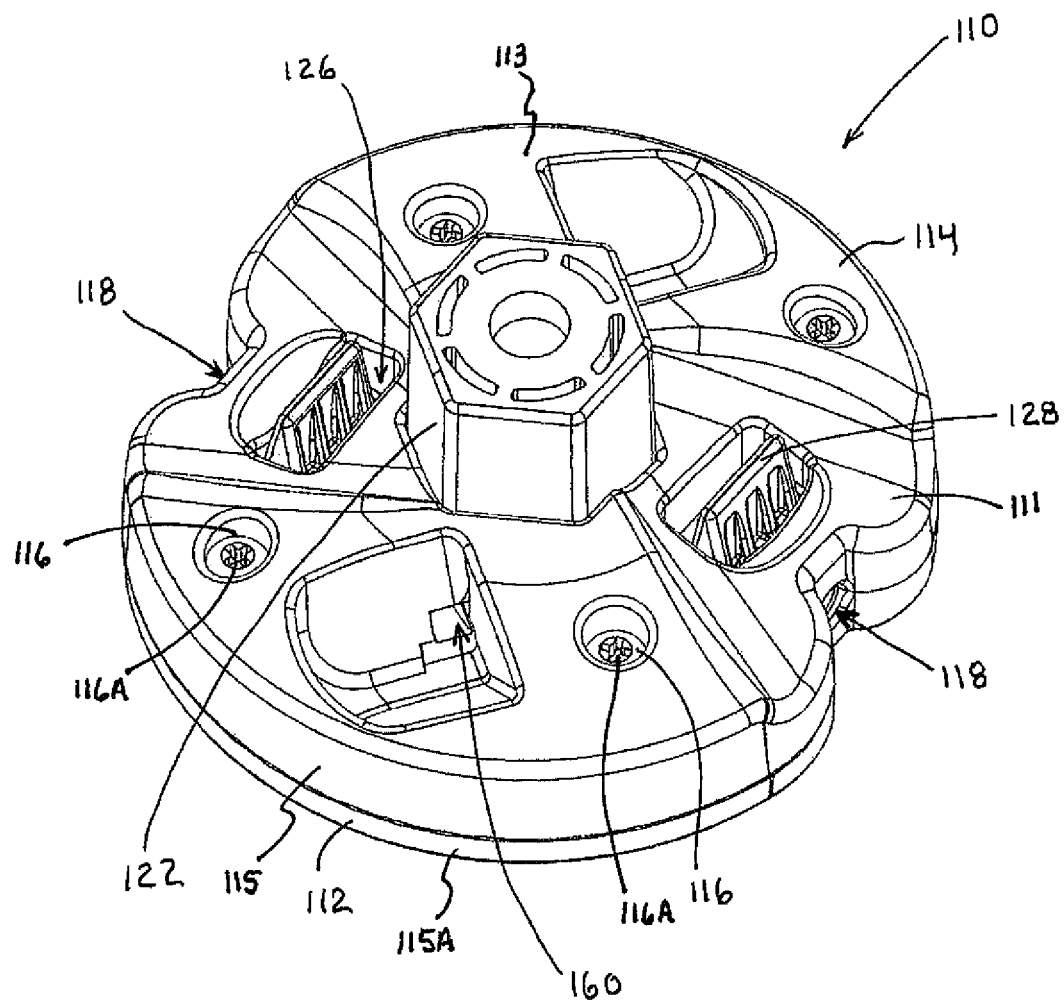
FIG. 5 shows a top perspective view of a second embodiment of a modified trimmer head having exits for the line channels of the trimmer head disposed on the top surface of the trimmer head.
Figure 6:
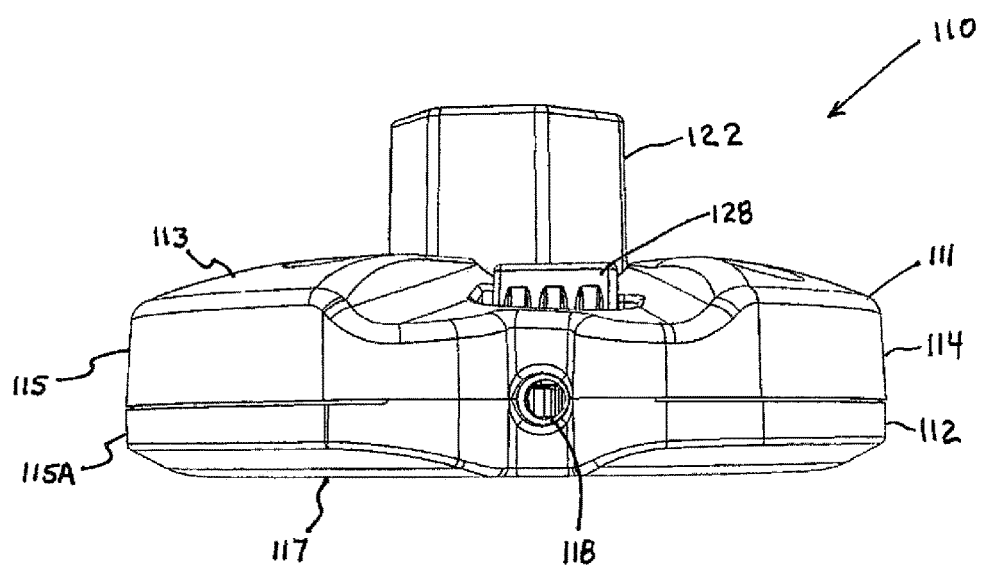
FIG. 6 is a side view of the trimmer head shown in FIG. 5.

The trimmer head 10 further includes an actuator 32 that, while used for the same purpose as used in Brant's patent, has been modified as shown in FIG. 4. Specifically, two springs 34 were mounted on the protruding wall 31 on either side of the actuator's base plate 33 to bias the actuator 32 towards the perimeter of the trimmer head 10 instead of the one spring used by Brant. The cover 14 has two opening 26 through which the lever buttons 28 on the actuator 32 protrude. The actuators 32 moved between ribs 30 located on either side of the actuators.

The trimmer head 10 also was modified to include bumpers 35 on either side of the entrances 18 to prevent damage to the entrance 18 and to prevent dirt and debris from entering the housing 11 through the entrance 18.

In order to evaluate the trimmer head 10, a prototype trimmer head was manufactured using a Computer Numerical Control (CNC) process from natural colored (off-white) glass-filled nylon to look, act and function like the trimmer head 10 shown in FIGS. 1-4. The trimmer head was mounted on a gas-powered string trimmer device that had an axis of rotation like axis X in the FIGS. 1 and 2. Each of two strips of 95-mil trimmer line were individually inserted into one of the two passageway entrances 18 and pushed into the line channels 19, passing between the pair of opposed clamps 36, 38, until the end of the line passed slightly through the discharge ports 60. The trimmer device was then used as is known in the art. When the strips of trimmer line were completely worn, the worn strips of line were removed by way of discharge port 60. New line strips were inserted into the trimmer head 10 as described above, and the trimming resumed. Within a few hours of trimming and cutting vegetation the trimmer head 10 would no longer grip the trimmer line. The trimmer head was removed from the trimmer machine and inspected. Both the bottom and top surfaces 17 and 13 of the trimmer head 10 including the buttons 28 on the actuators 32 were greatly discolored from use. The trimmer head 10 was disassembled (opened) and inspected. The line channel 19 was found to be discolored from the flow of debris into the trimmer head 10. The discoloration was darkest at the discharge port end 60 and became lighter towards the periphery of the head, implying that the debris entered the discharge ports 60. Debris (shredded grass clippings, dirt, and dust) had collected around the clamps 36. 38.

In an effort to address issue of the flow of debris into the trimmer head, a second trimmer head (110) was designed which is shown in FIGS. 5-8. For the second head, denoted generally by the numeral 110 in FIG. 5, all of the numbers used for identifying the components of the head were indexed by 100 relative to the prior trimmer head 10.

Like the trimmer head 10, the new trimmer head 110 (referring to FIGS. 5-8) has a housing 111 defined by a base 112 and a cover 114, both of which extend radially outward from a center axis of rotation identified by the broken line X. As shown best in FIGS. 5 and 6, the cover 114 includes a top surface 113 that faces upward when the trimmer head 110 is in use and that extends outwardly to a downward turning periphery 115 at the perimeter of the housing 111. The base 112 includes a bottom surface 117 that extends outwardly and downwardly for a portion in order to receive the nut for maintaining the trimmer head 110 on the trimmer device, and then extends outwardly and faces the ground when the trimmer head 110 is in use. The base 112 then extends outwardly to an upward turning periphery 115A at the perimeter of the housing 111, such that the downward turning periphery 115 of the cover 114 and the upward turning periphery 115A of the base 112 are operatively connected to complete the outer shell of the housing 111.

The cover 114 has remained the same as for the previous trimmer head 10 in that it contains two openings 126 through which the lever buttons 128 on the actuators 132 extend. However, in this trimmer head 110, the four apertures 116 containing screws 116A that are used to connect the cover 114 to the base 112, are found in the cover 114, not the base 112. Further, sandwiched between the cover 114 and base 112 are two eyelet ports 120 which are at the entrances 118 to the line channels 119. The actuator 132 is also generally like the actuator before in that it has two springs 134 that are mounted on the protruding wall 131 on either side of the actuator's base plate 133 to bias the actuator 132 towards the perimeter of the trimmer head 110.

Completely different from the prior trimmer head 10, this trimmer head 110 has a pair of exits or discharge ports 160 through the top surface 113 of the cover 114 that align with the opposite ends of the internal line channels 119. Thus, the discharge ports 160 are on the top of the trimmer head 110, not the bottom. Furthermore, the line channels are not directly in-line with the radial center axis of rotation X. Instead, the line channel 119 turns slight to miss the hub 122.

Further, due to the continued bumping of the bumpers 35 during use, the periphery 115, 115A of the trimmer head 110 was redesigned. In this embodiment, the entrance 118 was recessed within the periphery 115 to prevent damage or destruction to the entrance 118 or the eyelet port 120, and to enable to the trimmer line to be supported as it bends around the trimmer head 110.

To be used, a strip of trimmer line (not shown) can be inserted into the line channel 119 through entrance 118, passed between the pair of opposed (and in this case, pivoting) clamps 136, 138, up a ramp 170 on the line channels 119, and out the discharge ports 160 located on the top of the trimmer head 110. Each line channel 119 is a combination of surfaces inside the head which guide the trimmer line from the entrance port 118 to the exit port 160. As this trimmer head includes two entrances 118, two line channels 119 and two exits 160, the line insertion process is repeated such that a second strip of trimmer line is installed. Ideally, one end of the trimmer line strip is to be inserted into each entrance 118 until the same end is seen and passes slightly through an exit port 160. As a minimum, the end of the trimmer line must be pushed past the clamps 136, 138.

During the line insertion process, the inward movement of the line causes the opposed clamps 136 and 138 to pivot away from the trimmer line, increasing the clearance or gap between the clamps 136, 138. If the line is not stiff enough to push the clamps 136, 138 apart, then the actuator can be used to open the clamps 136, 138 manually. To actuate the clamps via the actuator, the round posts 148 and 150 on top of the clamps push on the sidewall 168 located around the slot 166 on the underside of the actuator (see FIG. 8). Clamp 136 pivots on a post 140, and clamp 138 pivots on a second post 142. The five teeth on each of the two clamps are basically mirror images of each other, and their faces (portion with teeth) pivot away from each other when line is inserted or the actuator is pressed inward. Insertion of the trimmer line pushes on the clamps 136, 138, which in turn pushes the actuator at least slightly toward the center of the head, thus compressing the springs 134. The movement of each actuator 132 is bound by two ribs 130 located on either side of each actuator 132. The trimmer line, when inserted, can easily move in the direction from the entrance 118 towards the exit or discharge port 160. However, once the trimmer line passes the interface between the two clamps 136, 138, it cannot reverse direction, unless the actuator 132 is manually pushed and held at a position or setting capable of maintaining the opposed clamps 136, 138 open, which in this context provides for a gripping portion 190 or teeth of each of the opposed clamps 136, 138, to be turned away from each other and substantially out of the center axis of the line channel 119 such that the gripping portion 190 or teeth of the opposed clamps no longer interface with each other. The use of such an actuator 132 is not found on other commercial fixed-line trimmer heads. If an attempt is made to pull the trimmer line in the reverse direction out of the entrance 118, then the compression springs 134 pushes on the actuator 132, which in turn pushes on the round post 148 and 150 on the opposed clamps 136, 138. This action causes the clamps 136, 138 to pivot to their biased, closed position and the gripping portion 190 or teeth at the interface of the opposed clamps contact and grip the surface of the trimmer line. The teeth then grip the trimmer line in a manner sufficient to prevent further movement of the line toward the periphery 115 of the trimmer head 110.

Further improvements made to trimmer head 110 include, relative to Brant's trimmer head, the use of two springs 134 per actuator instead of one. Each pair of springs 134 are located on either side of the actuator so that the center of the actuator is not blocked by the spring, allowing the center of the actuator to align with the path of the trimmer line 119, which again has been turned so to miss hub 122. Relative to trimmer head 10, the central hub 122 was also changed to a hexagon shape so that the actuator 132 could be moved closer to the central axis of rotation X and the line channels 119 were offset so they are no longer radial. Again, this was done so that the line channel 119 could pass adjacent to the adjoining wall of the hexagon hub with a minimal bending of the line channel 119. This allowed the overall trimmer head diameter to be smaller and for the trimmer line to be inserted into the line channel 119 with minimal resistance from bending the line after passing through the opposed clamps 136, 138. The diameter of the head 110 was reduced to less than four (4) inches.

For the trimmer line to discharge out the top of the trimmer head 110, the line channel required a ramp 170. This ramp angles the trimmer line upward so that it can pass out of the exit or discharge port 160.

Figure 7:
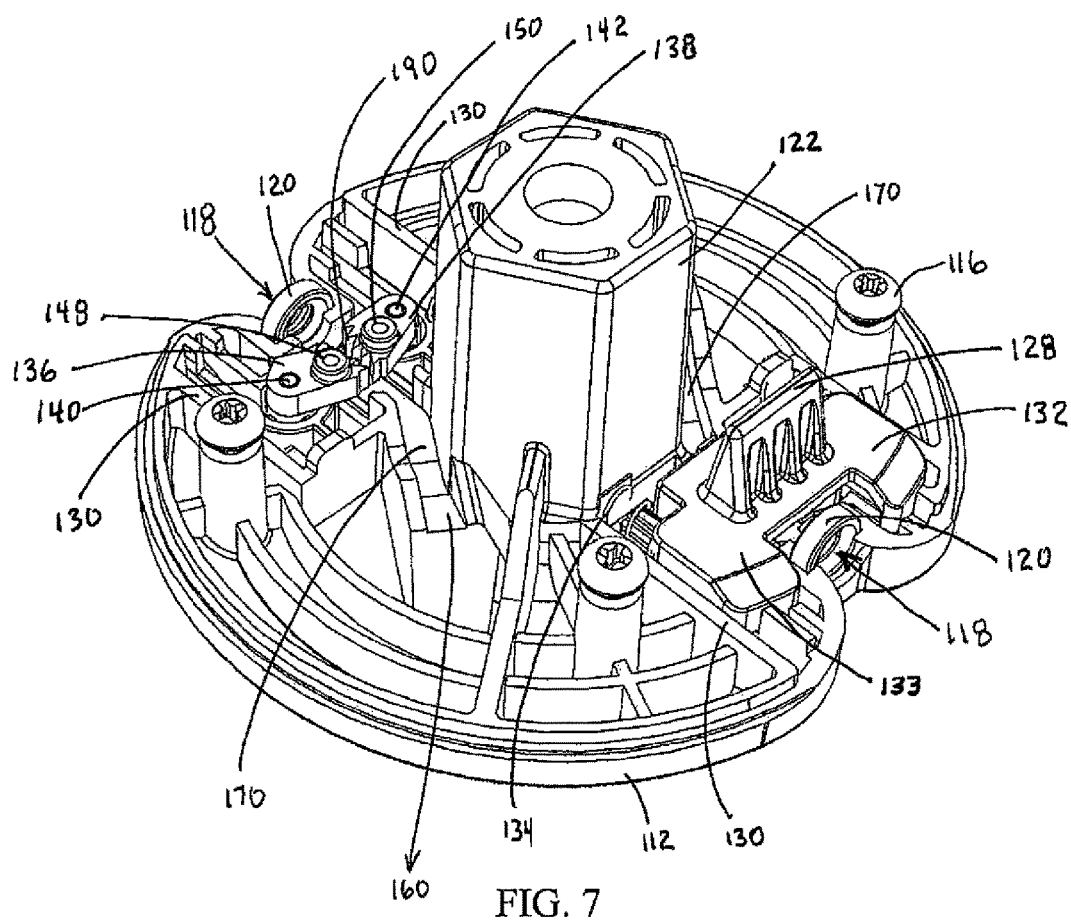
FIG. 7 is a top perspective view of the trimmer head shown in FIG. 5 with the cover removed along with one of the actuators and two springs removed from the second embodiment of the trimmer head shown in FIG. 5.
Figure 8:
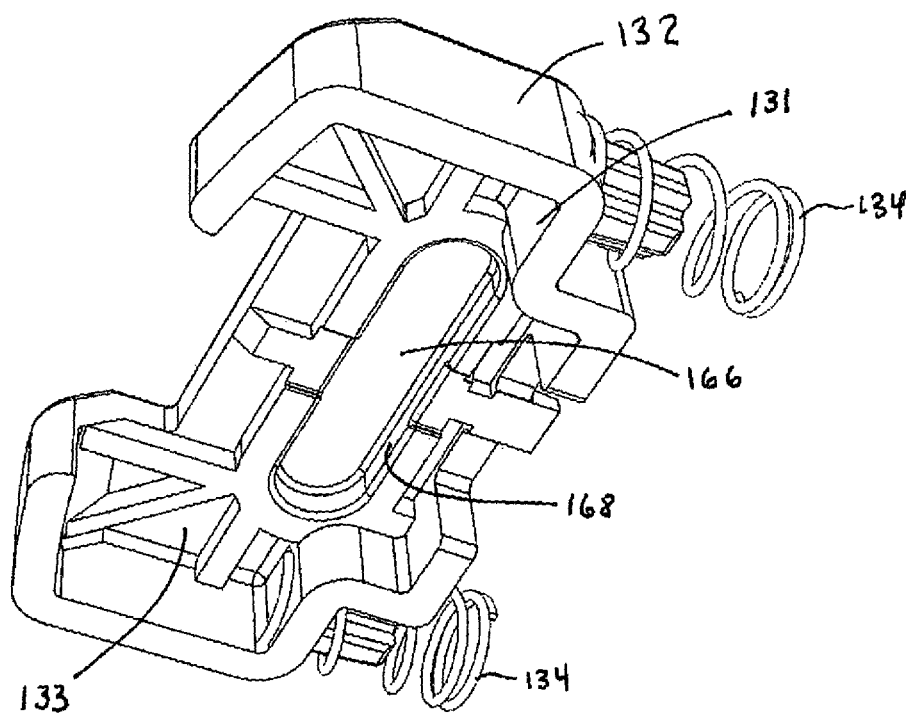
FIG. 8 is a bottom perspective view of the actuator with springs attached, used with the trimmer head in FIG. 5.
Figure 9:
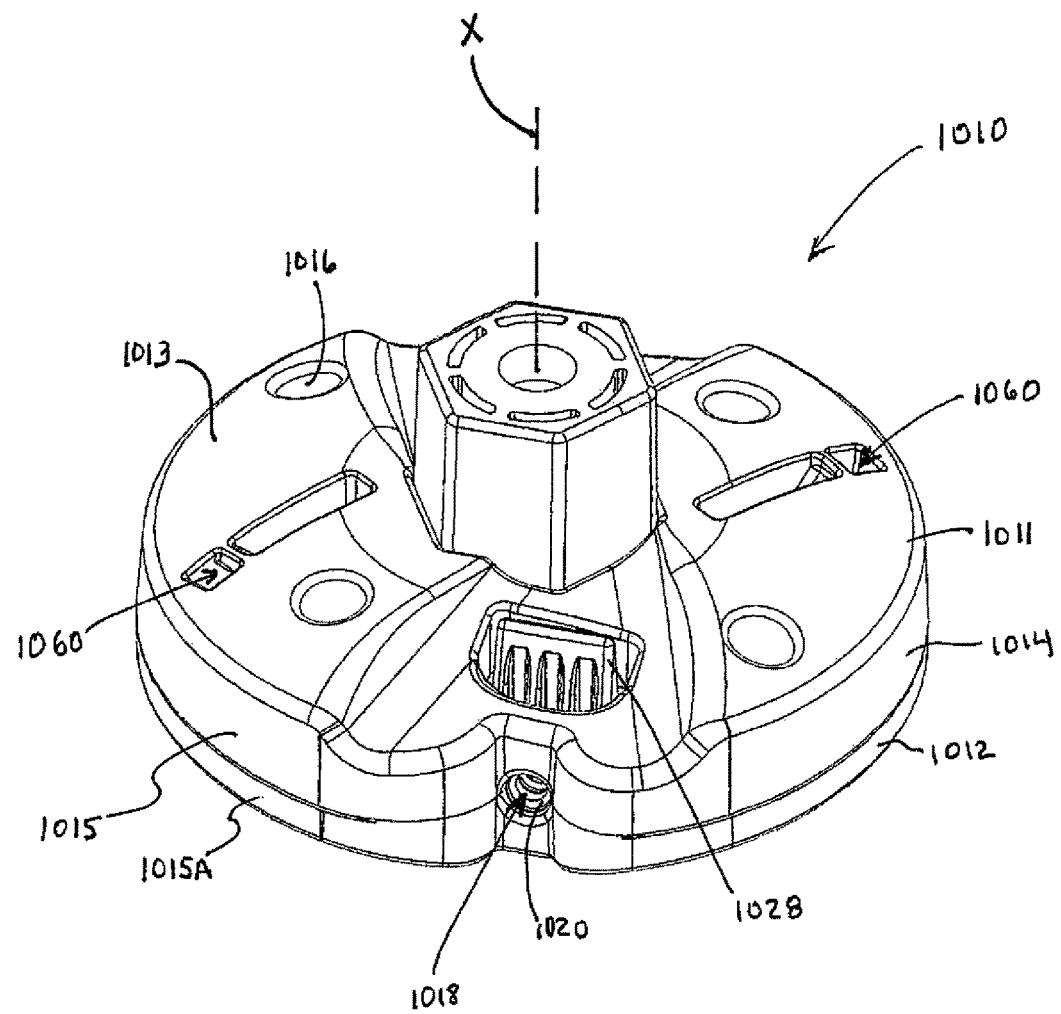
FIG. 9 is a top perspective view of the an embodiment of the trimmer head of the present invention.

As seen in FIG. 7, the top of the clamps have been modified. The upward projecting ribs taught by Brant have been removed and replaced with two round posts, 148 and 150. The rollers that were fastened to the inside bottom side of the actuator have also been removed. Brant taught using the rollers on the actuator to press against the upward projecting ribs. To simplify the trimmer head design, the round posts 148 and 150 fit into a slot 166 located on the bottom side of the actuators 132 (see FIG. 8). The posts 148 and 150 simply slide along vertical walls 168 of this slot.

In order to evaluate the trimmer head 110, another prototype based upon trimmer head 110 was machined from natural colored glass-filled nylon using a CNC process. The prototype was mounted on the same gas trimmer as before and loaded with 95 mil trimmer line as described in the previous trial and used for trimming and cutting the same type of vegetation. Whenever the line was worn beyond the point of being usable, it was replaced by removing the worn trimmer line through the exit or discharge port 160 and re-loading the trimmer line as taught above. Trimming then continued. After 11 hours of use, the interfacing opposed clamps would no longer grip and hold the newly inserted line. Again the prototype was removed from the trimmer and opened. Debris and pieces of grass were found located inside of the head in the area of the opposed clamps 136, 138, and the line channel 119 had the greatest amount of discoloration at the discharge port end 160. The discoloration diminished the closer the channel approached the clamps 136, 138. This was an improvement compared to the prior trimmer head that had the discharge port toward the ground, but still did not prevent dirt and debris from entering the trimmer head through the discharge port. Given that the average residential consumer typically uses a trimmer device for about 13 hours per year, such a trimmer head 110 would not be acceptable unless the consumer were to clean out the head at least once per season, which is not practical.

In light of the foregoing and without being bound by theory, it was believed that the dirt and debris was being pulled (vacuumed) into the line channel through the discharge ports because of the differences in rotational speeds at the entrance and discharge ports to the line channel. The difference in air velocities across the ports is believed to have created a pressure gradient which caused the air to flow through the line channel. That is, air was being pumped through the line channel which was vacuuming dirt and debris into the exit channel (point of low velocity). However, once inside the head, the debris and dirt would reach the clamp, where the channel is wider to accommodate the clamps. This allows the debris to collect at this point, and eventually to interfere with the pivoting motion of the opposed clamps. To prevent air from being pumped through the line channel, it is believed that the entrance and discharge points needed to be equidistant from the axis of rotation X. To test this theory, the design of the trimmer head was modified as shown in FIGS. 9 through 17.

A third trimmer head, designated generally by the numeral 1010, was designed and produced as shown FIGS. 9-19, the details of this embodiment of the invention now being described. For this third trimmer head 1010, all of the numbers used for identifying the components of the trimmer head were indexed by 1000 relative to the first trimmer head 10 and by 900 relative to the previous trimmer head 110.

Figure 10:
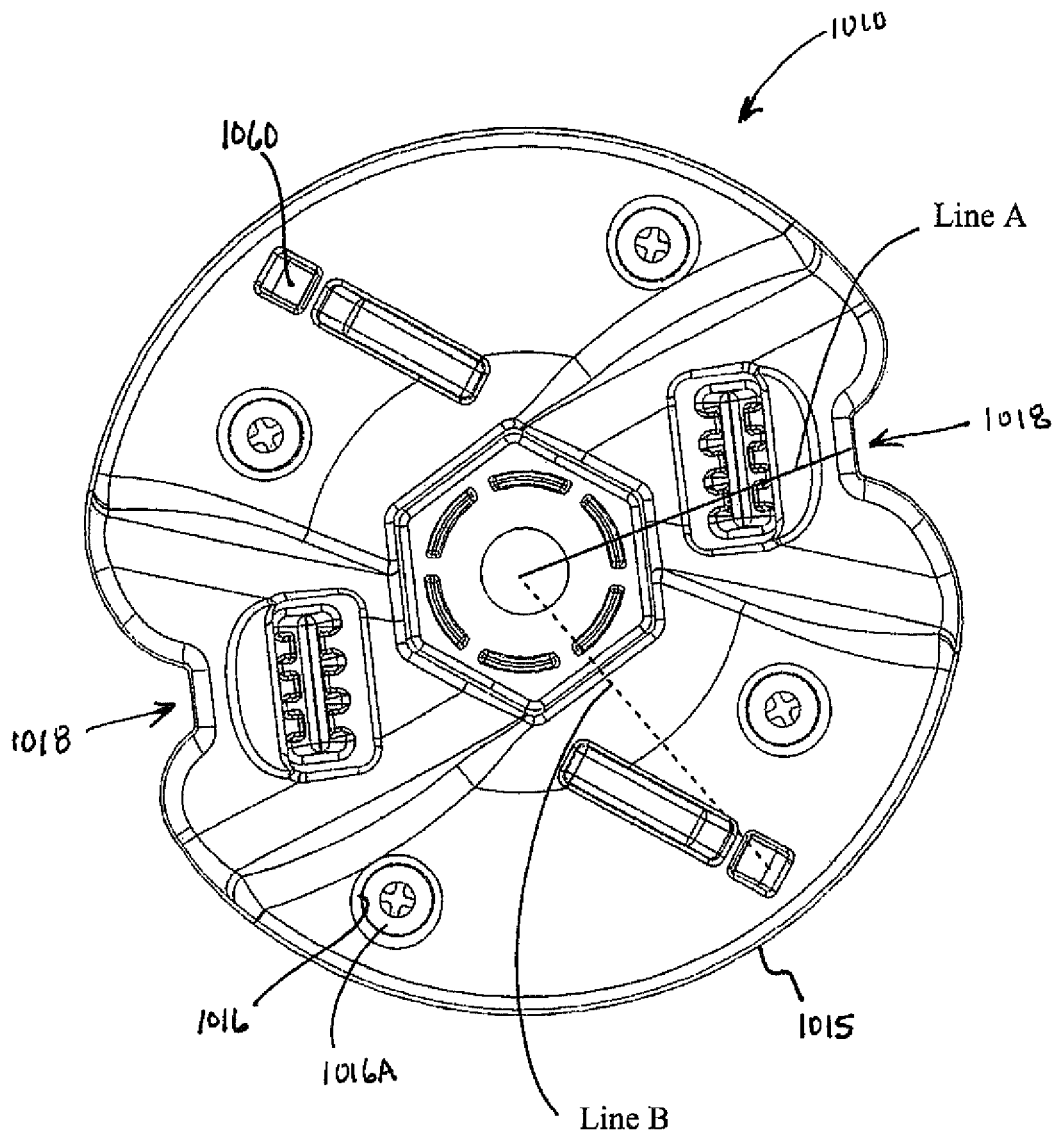
FIG. 10 is a top view of the embodiment of the trimmer head shown in FIG. 9.
Figure 11:
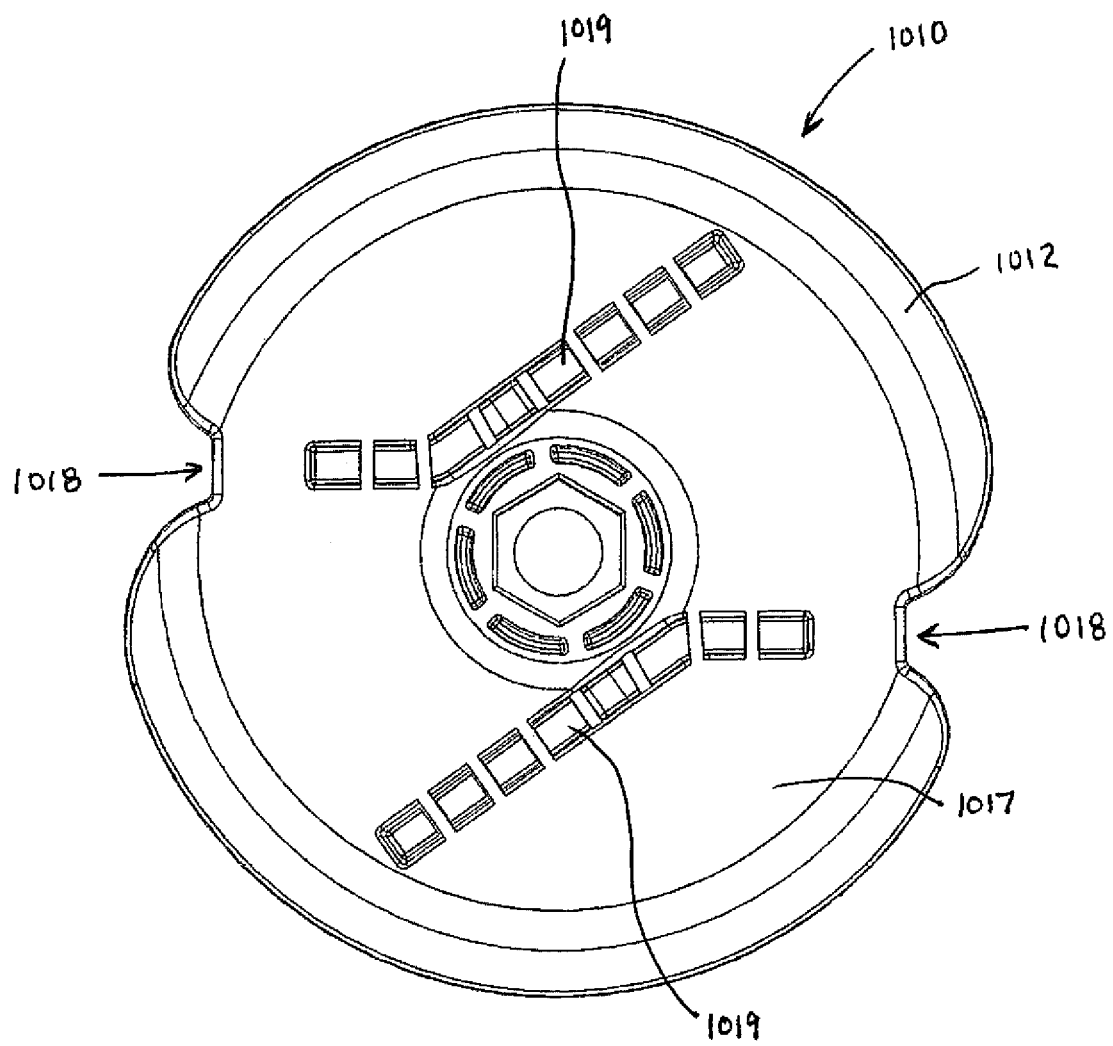
FIG. 11 is a bottom view of the embodiment of the trimmer head shown in FIG. 9.
Figure 12:
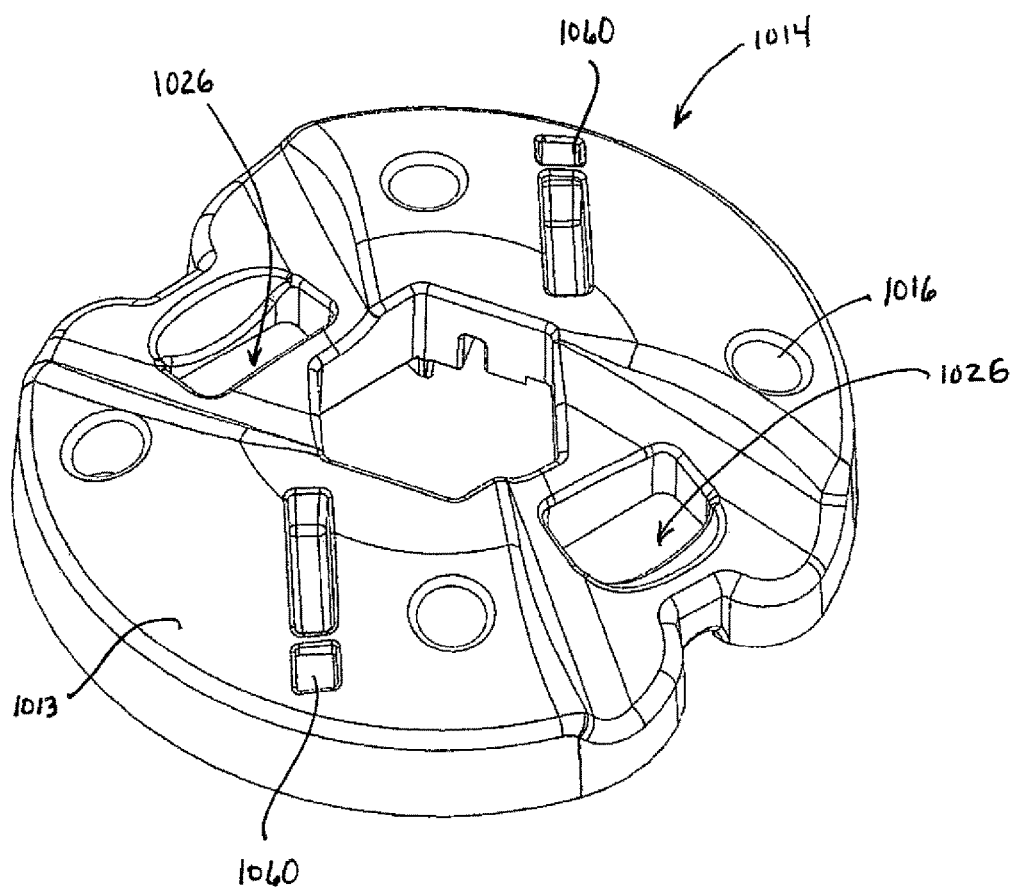
FIG. 12 is a top perspective view of the cover of the embodiment of the trimmer head shown in FIG. 9.
Figure 13:
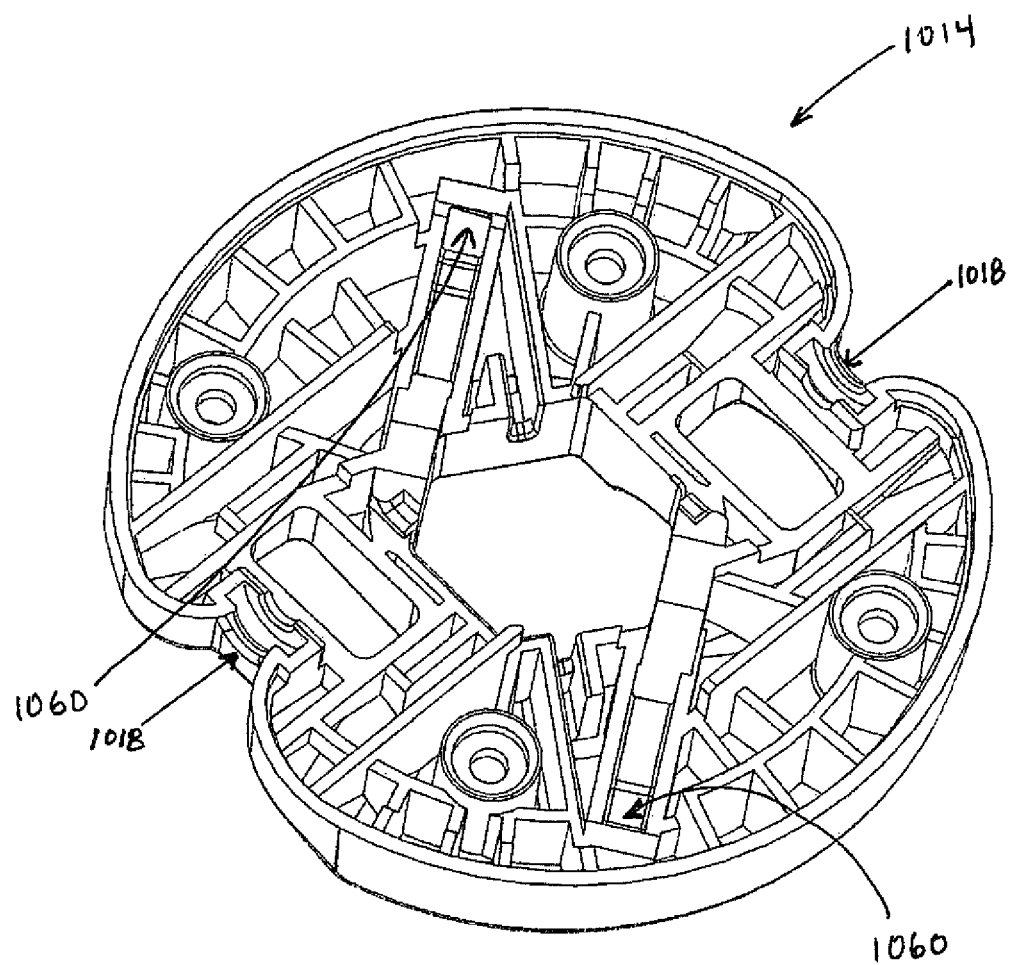
FIG. 13 is a bottom perspective view of the cover shown in FIG. 12.
Figure 14:
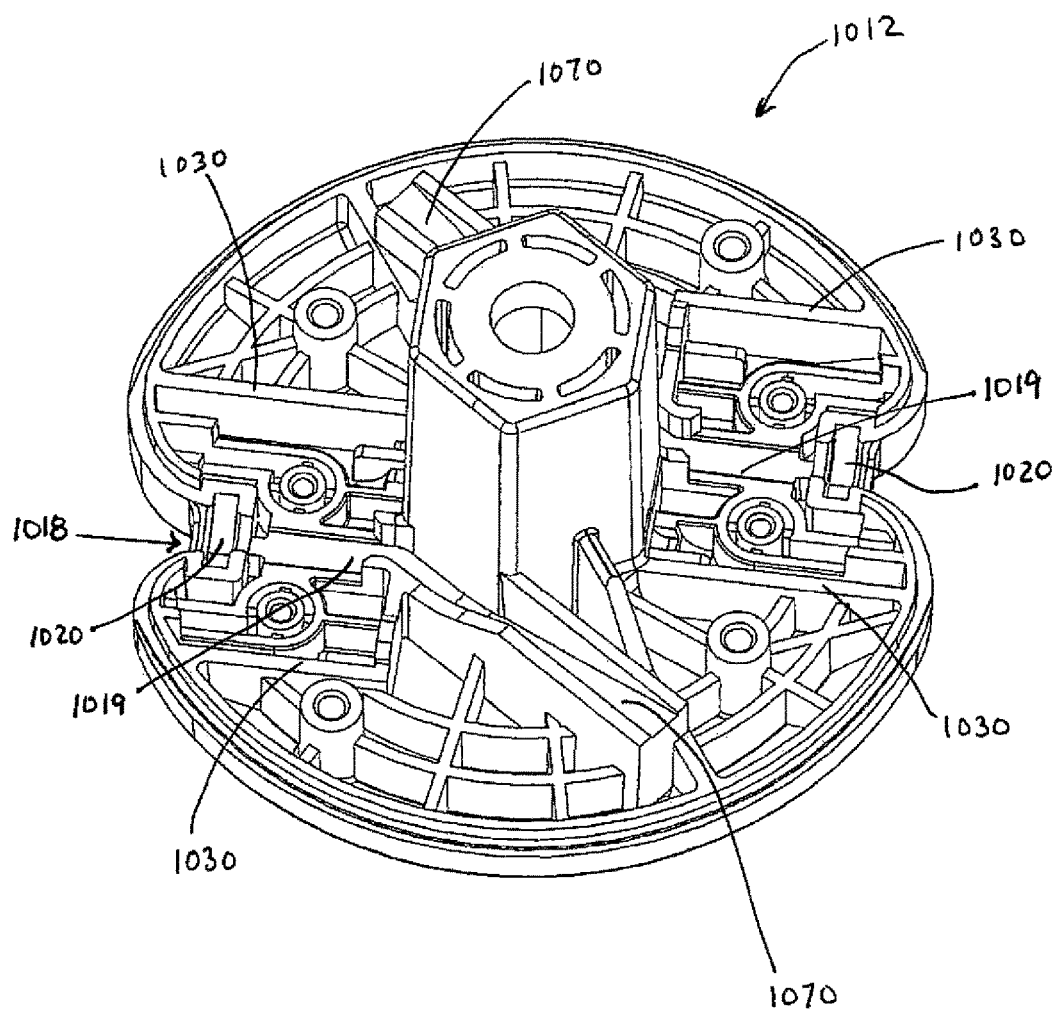
FIG. 14 is a top perspective view of the base of the embodiment of the trimmer head shown in FIG. 9.
Figures 15, 15A:
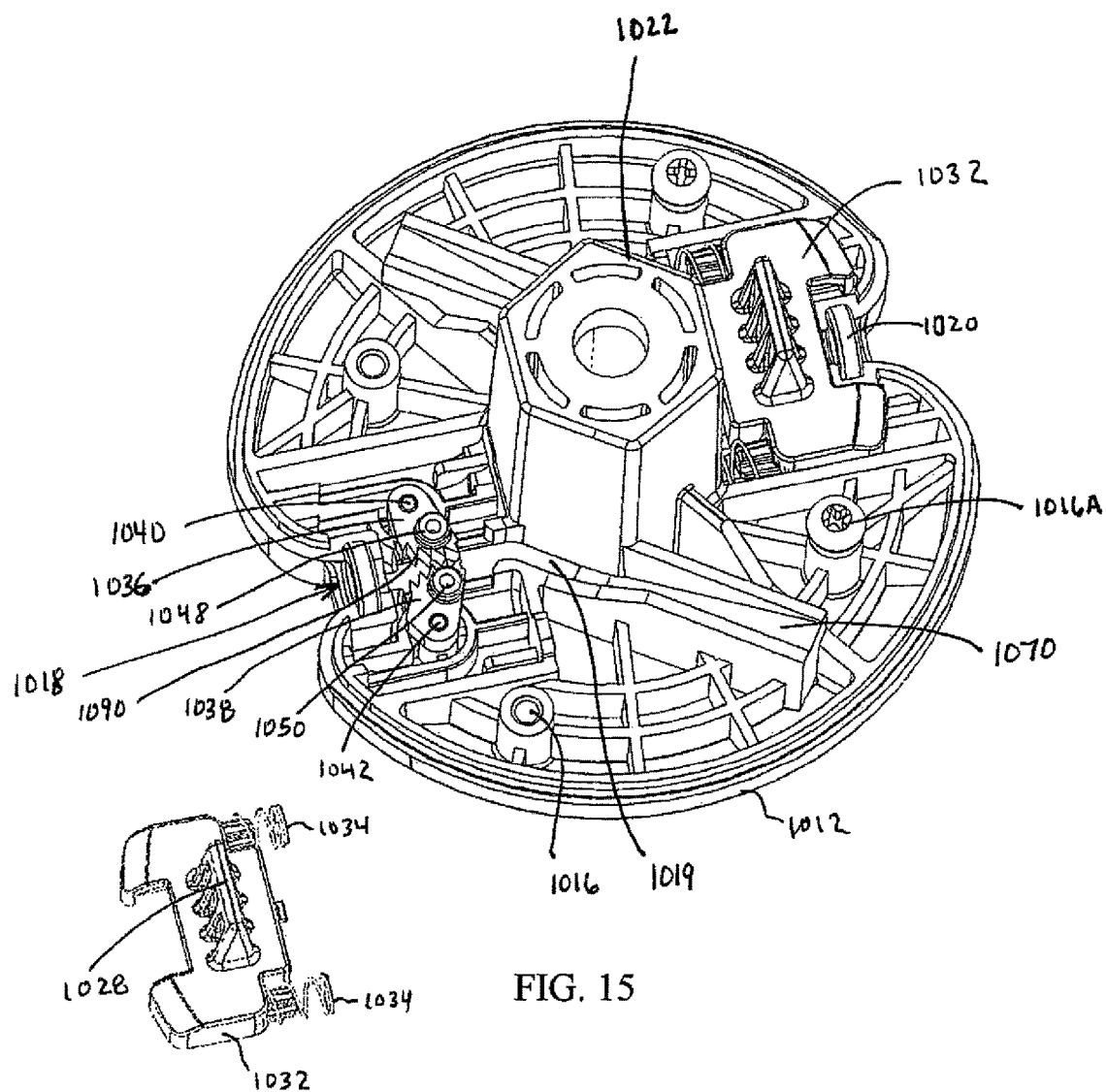
FIG. 15 is an top perspective view of the trimmer head shown in FIG. 9, with the cover removed and one of the actuators removed
FIG. 15A is a top perspective view of the actuator removed and offset from FIG. 15.
Figure 16:
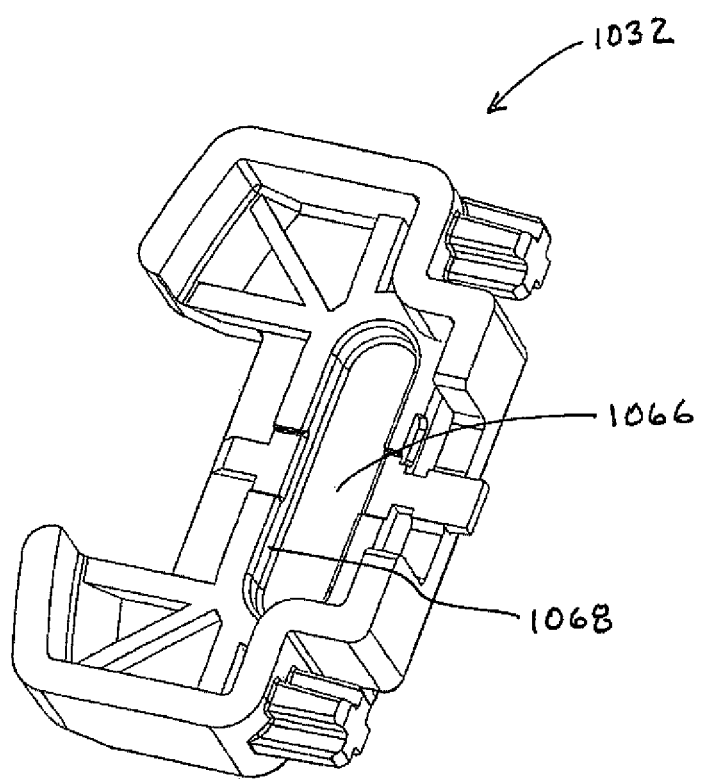
FIG. 16 is a bottom perspective view of the actuator used in the trimmer head in FIG. 9.

Generally the trimmer head 1010 is substantially similar to the trimmer head 110 except for the fact that the entrance (1018) and exit (1060) ports to the internal line channel 1019 are designed to be an equal distance from the axis of rotation X of the trimmer device. As best shown in FIG. 10, this is represented by the length of the solid line (Line A) between the point of the radial central axis rotation (denoted as point X in FIG. 10) and a point P at or near the center of the entrance 1018 and the length of the broken line (Line B) between the point of the radial central axis of rotation (point X) and point Q at or near the center of the exit 1060. It will be appreciated that since the entrance 1018 of trimmer head 1018, like the entrance 118 of trimmer head 110, has been recessed within the periphery 1015 of the trimmer head housing 1011, the distance to the central axis of rotation is not to the perimeter of the trimmer head, but rather is short of that distance. Consequently, it will be appreciated that the distance to the exit port 1060 can be of an equal distance and the exit port still be located on the top surface 1013 or bottom surface 1017 of the cover 1014 or base 1012, respectively. If the entrance port were positioned at the periphery 1015 of the housing 1011, then the exit port would not be able to be the same distance from the central axis of rotation (X) without also being on the periphery of the trimmer head. However, if the exit port was located at the periphery of the trimmer head, then the trimmer line that extends out of the exit port would impact the vegetation in the same manner as the trimmer line that extends out of the entrance port. This design would not be practicable, given that a trimmer line having both ends being cutting ends is not contemplated by the present invention. Other than this modification to the location and shape of the discharge port 1060 to be the same distance from the axis of rotation as is the entrance 1018, all other aspects on the trimmer head 1010 were kept the same as the head 110.

In order to demonstrate and evaluate the trimmer head 1010, another prototype based upon the trimmer head shown in FIGS. 9-17 and described herein was prepared using a CNC process and natural colored glass-filled nylon. The prototype trimmer head 1010 was mounted on the same gas trimmer machine as before, loaded with strips of 95 mil trimmer line, and used for trimming the same type of tall grass as previously described. Again, whenever the line was worn beyond the point of being usable, it was replaced by removing the worn trimmer line through the exit or discharge port 1060 and re-loading the trimmer line as taught above. Trimming then continued.

After 15 hours of use, the trimmer head 1010 was inspected. Very little dirt and debris was found inside of the trimmer head 1010. The head was reassembled and trimming was continued. After 40 hours of total use, very little debris was found inside the trimmer head 1010. Additionally, there was very little discoloration of the line channel 1019. This data confirmed that placement of the trimmer line exit port 1060 and the entrance port 1018 an equal distance from the central axis of rotation (X) of the trimmer head 1010 is one means to eliminating or prevent dirt and debris from entering the line channels 1019 on a fixed line trimmer head.

Figure 17:
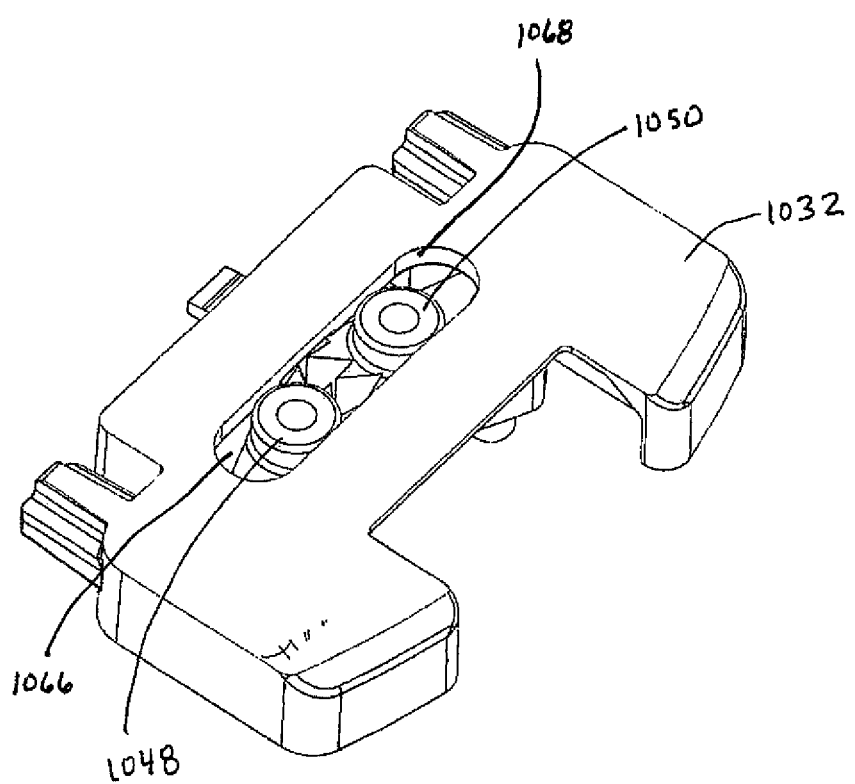
FIG. 17 is a top perspective view of the actuator with the lever button removed and the opposed interfacing clamps partially shown as used in the embodiment of the trimmer head shown in FIG. 9.

FIG. 17 shows the interaction between the posts 1048 and 1050 and the actuator 1032. If the user presses on the lever button 1028 (see FIG. 15), then the actuator 1032 moves from a first setting to a second setting closer towards the trimmer head's central axis of rotation (X) and hub 1022. This action compresses the springs 1034, forcing the two posts 1048 and 1050 against side wall 1068 and away from each other within slot 1066. In turn, the separation of the posts 1048 and 1050 forces the two clamps 1036 and 1038 to move or pivot away from each other such that the gripping portion 1090 of the clamps 1036, 1038 can no longer interface with each other and provides for an open space or gap within the axial center of the line channel 1019 between the two clamps 1036, 1038. Once the clamps 1036, 1038 are in the open position, then the trimmer line can be inserted or removed in both directions through the entrance 1018 recessed within the periphery 1015 of the trimmer head housing 1011. Alternatively, one end of a strip of trimmer line can be inserted into the entrance 1018 and pushed against the clamps 1036, 1038. This action will cause the clamps 1036, 1038 to pivot, which in turn will cause the post 1048, 1050 to push on the actuator. The actuator 1032 will move at least slightly without being touched by the user, compressing the springs 1034. The line will continue in this direction when pushed, but will be gripped by the teeth or gripping portion 1090 if pulled in the opposite (outward) direction.

The trimmer line can only be removed through the entrance 1018 if the lever button 1028 on actuator 1032 is pressed away from the periphery 1015 of the housing 1011. Otherwise, the springs 1034 press on the actuator 1032, which makes the teeth or gripping portion 1090 on the clamps grip the sides of the trimmer line. In this later situation, the trimmer line is gripped by the interfacing, opposed, pivoting clamps 1036, 1038 and, thus, cannot be removed.

Like the trimmer head 110, the new trimmer head 1010 (see FIGS. 9-19) has a base portion 1012 and a cover portion 1014. The cover contains two openings 1026 through which the lever buttons 1028 on the actuators 1032 extend. Four apertures 1016 having fasteners such as screws 1016A are used to connect the cover 1014 to the base 1012. Sandwiched between the cover and base are two eyelet ports 1020 which are at the entrances 1018 to the line channels 1019. Corresponding exit ports 1060 on the cover 1014 are align with the opposite ends of the internal line channels 1019. The trimmer head 1010 in FIGS. 9-16 is shown has having the pair of exits or discharge ports 160 through the top surface 1013 of the cover 1014. It will be appreciated that it is envisioned that the discharge ports 1060 could alternatively be on the bottom surface 1017 of the trimmer head 1010 without affecting the essential nature of the invention. That is, provided the entrance and exit ports would still be an equal distance from axis of rotation (X), then it is believed that dirt and debris would be prevented from entering the discharge port even if located on the bottom of the trimmer head.

A strip of trimmer line (not shown) can be inserted into the line channel 1019 by way of entrance 1018, passing between the pair of interfacing, opposed, pivoting clamps 1036, 1038, up a ramp 1070 on the line channels 1019, and out the discharge ports 1060 located on the top of the trimmer head. Each line channel 1019 is a combination of surfaces inside the head which guide the trimmer line from the entrance port 1018 to the exit port 1060. As the trimmer head 1010 as shown includes two entrances, two line channels and two exits, the line insertion process is repeated two time, with one strip of trimmer line being installed in each line channel 1019. Ideally, one end of the trimmer line strip is to be inserted into each entrance 1018 until the same end is seen at an exit port 1060. As a minimum, the end of the trimmer line must be pushed past the clamps 1036, 1038.

During the line insertion process, the inward movement of the line should cause the clamps 1036 and 1038 to pivot away from the line, increasing the clearance between the clamps 1036. If the line is not stiff enough to push the clamps 1036, 1038, then the actuator 1032 may be used to open the clamps 1036, 1038. The round posts 1048 and 1050 on top of the clamps 1036, 1038, respectively, push on the sidewall 1068 located around the slot 1066 on the underside of the actuator (see FIG. 16). Clamp 1036 pivots on a post 1040, and clamp 1038 pivots on a second post 1042. The gripping portion 1090 or teeth on each of the two clamps are basically mirror images of each other, and their faces (portion with teeth) pivot away from each other when line is inserted or the actuator is pressed inward. Insertion of line pushes on the clamps 1036, 1038, which pushes the actuator 1032 toward the center of the head (i.e., towards hub 1022), thus compressing the springs 1034. The movement of each actuator 1032 is bound by two ribs 1030 located on either side of each actuator 1032. The trimmer line, when inserted, can easily move in the direction from the entrance port 1018 towards the exit port 1060. However, once the trimmer line passes the interface between the two clamps it cannot reverse direction, unless the actuator 1032 is manually held in a position to hold open the clamps 1036, 1038. Again, such use of an actuator 1032 is not used by the other commercial fixed-line trimmer heads. If the line direction is reversed, then the compression springs 1034 pushes on the actuator 1032, which in turn pushes on the round post 1048 and 1050 on the clamps 1036, 1038, respectively. This action causes the clamps 1036, 1038 to pivot to the biased, closed position and the gripping portion 1090 or teeth at the interface of the opposed clamps contact the surface of the trimmer line. The teeth then grip the line and prevent further movement of the line toward the periphery 1015 of the trimmer head housing 1011.

Figure 19:
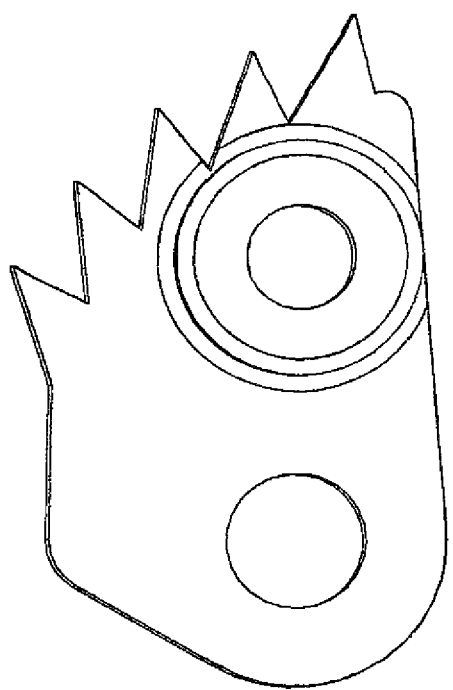
FIG. 19 is a top view of the right clamp or jaw used in the embodiment in FIG. 9.
Figure 18:
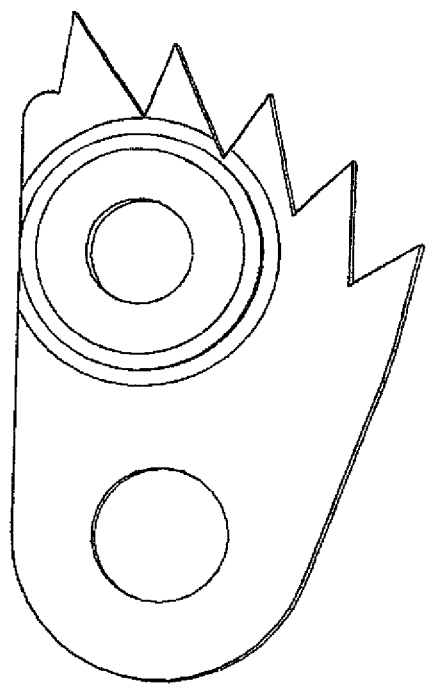
FIG. 18 is a top view of the left clamp or jaw used in the embodiment in FIG. 9.

One embodiment of the clamps 1036 and 1038 is shown in FIGS. 18 and 19. Testing of the line holding capability of this design has proven that the clamps can resistance a pulling force on the line in excess of 30 pounds of force in on one embodiment, in excess of 40 pounds of force in another embodiment, and in excess of 50 pounds of force in yet another embodiment. The test was stopped at 50 pounds to prevent breaking the prototype samples. This performance is greater than the line holding capability of the commercially available heads with single pivoting cam or single cleats, which typically cannot resist a pulling force of more than 30 pounds.

The clamping mechanism embodied in the opposed clamps above is based upon a pair for metal pivoting cleats or jaws. The jaws are detailed in FIGS. 18-19. When looking at an upper perspective view of the clamps or jaws from the direction of the entrance passageway 1018, the closest left jaw is defined by FIG. 18 and the closest jaw on the right is defined by FIG. 19. Each jaw has between three and eight teeth, and more preferably, has between four and six teeth. In the embodiments shown, each jaw has five teeth. The size and position of the teeth have been optimized to ensure at several teeth from each jaw will grip the trimmer line regardless of the line diameter. The jaws are designed to hold trimmer line ranging from sizes less than 50 mils to sizes larger than 155 mils.

It will be appreciated that any of a number of variations of the clamps can be provided without departing from the scope of the present invention. For example, a trimmer head could be designed with one set of dual-facing clamps and a counterbalance, or three pairs of equally spaced, opposed interfacing clamps, or even more pairs of opposed interfacing clamps. By increasing the diameter of the trimmer head, there would be more room for more pairs of opposed clamps. Furthermore, the clamping means could be changed to a single biased pivoting clamp in combination with a pressing wall as known in the prior art, so long at the entrance and exit ports to each line channel are provides as being an equal distance from the axis of rotation. Still further, the clamping means could be changed to a reciprocating cleat in combination with a pressing wall, so long at the entrance and exit ports to each line channel were an equal distance from the axis of rotation. Again, the design of any clamping mechanism suitable for holding the trimmer line within the line channel could be used provided the entrance and exit ports to each line channel are an equal distance from the axis of rotation of the trimmer head. If this is the case, the trimmer head would not accumulate significant debris in the head relative to designs that are currently offered commercially.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

It will be appreciated that more than one embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fixed-line trimmer head for a rotary trimmer device, the trimmer head comprising:

a housing operatively attachable to the rotary trimmer device, the housing being rotatable when in use around a central axis of rotation and having a top surface extending outwardly from the central axis and facing upward when in use, a bottom surface extending outwardly from the central axis and facing the ground when in use, and a periphery connecting the top surface to the bottom surface;

at least one line channel defined within the housing of the trimmer head having an entrance port recessed within the periphery and an exit port disposed on one of the top and bottom surfaces, wherein the entrance port and the exit port are each located an equal distance from the axis of rotation, wherein the entrance port recessed within the periphery is defined by a wall extending from the top surface and from the bottom surface, the wall being located at the equal distance from the axis of rotation;

an actuator comprising:
at least one wall defining a slot; and
a pair of biasing members configured to bias the actuator in a direction away from the central axis of the housing; and a pair of opposed clamps each comprising a post disposed within the slot of the actuator, wherein the posts are configured to slide within the slot, in a direction perpendicular to the actuator movement.

2. The fixed-line trimmer head as claimed in claim 1, wherein the pair of opposed clamps is positioned in operative contact with the at least one line channel, each clamp having a gripping portion, the clamps being movable between a first position wherein the gripping portion of each clamp interfaces with the gripping portion of the other clamp within the line channel and a second position wherein the gripping members are moved away from each other such that the gripping portions of each clamp do not interface with each other within the at least one line channel.

3. The fixed-line trimmer head as claimed in claim 2, wherein the pair of opposed clamps are pivotable between the first position and the second position.

4. The fixed-line trimmer head as claimed in claim 2, wherein the posts are configured to slide operatively from a first position to a second position within the slot of the actuator as the actuator approaches the central axis of the housing.

5. The fixed-line trimmer head as claimed in claim 4, wherein the actuator is movable between a first setting wherein the pair of opposed clamps are disposed in the first position and a second setting wherein the pair of opposed clamps are disposed in the second position, and wherein the actuator is biased to maintain the first setting unless acted upon.

6. The fixed-line trimmer head as claimed in claim 5, wherein the entrance port at one end of the at least one line channel is configured to receive a length of trimmer line into the at least one channel and wherein the exit port at the other end of the at least one line channel is configured for removal of any remaining worn length of trimmer line.

7. The fixed-line trimmer head as claimed in claim 6, wherein the pair of opposed clamps within the at least one line channel holds the trimmer line that has passed through the at least one line channel from the entrance port to the exit port, such that when the actuator is in the first setting and the clamps are in the first position, the trimmer line may pass through the at least one line channel in the direction from the entrance port to the exit port, but may not reverse direction, but when the actuator is in the second setting and the clamps are in the second position, the trimmer line may pass through the at least one line channel in either direction.

8. A method for holding a fixed length of trimmer line having first and second ends to a fixed-line trimmer head during rotation for cutting vegetation, the method comprising:
providing a housing operatively attachable to a rotary trimmer device, the housing being rotatable when in use around a central axis of rotation and having a top surface extending outwardly from the central axis and facing upward when in use, a bottom surface extending outwardly from the central axis and facing the ground when in use, and a periphery connecting the top surface to the bottom surface;
inserting the first end of the trimmer line into an entrance port to a line channel defined within the housing, the entrance port being recessed within the periphery;
passing the trimmer line through the line channel and through a pair of opposed clamps for holding the trimmer line within the line channel, each clamp comprising a post;
removing an amount of the first end of trimmer line through an exit port disposed on one of the top and bottom surfaces sufficient to pull any remaining worn length of line from the line channel upon use, wherein the entrance port and the exit port are an equal distance from the central axis of rotation;
holding the trimmer line within the line channel with the pair of opposed clamps under sufficient force to enable the second end of the length of line that remains outside the entrance port and the periphery of the housing to cut vegetation during rotation of the trimmer head; and
actuating an actuator to adjust the fixed length of trimmer line, the actuator comprising:
a pair of biasing members; and
at least one wall defining a slot of the actuator, wherein the post of each clamp is disposed within the slot such that the post slides within the slot in a direction perpendicular to movement of the actuator, upon actuation of the actuator,
wherein the entrance port is defined by a wall extending from the top surface and from the bottom surface, the wall being located at the equal distance from the central axis of rotation.

9. The method for holding a fixed length of trimmer line as claimed in claim 8, wherein each clamp of the pair of opposed clamps have a gripping portion and wherein the step of passing the trimmer line through the line channel includes the step of allowing the trimmer line to pass through an interface of the gripping portions of the pair of opposed clamps in one direction from the entrance port to the exit port, but not in the reverse direction.

10. The method of holding a fixed length of trimmer line as claimed in claim 9, wherein the step of passing the trimmer line through the line channel includes the step of actuating the actuator external of the housing to move the gripping portions of the pair of opposed clamps away from the line channel so as to allow the trimmer line to pass through the line channel in both directions.

11. The method of holding a fixed length of trimmer line as claimed in claim 10, wherein the step of actuating includes the step of biasing the actuator to a setting that allows the trimmer line to pass through an interface of the gripping portions of the pair of opposed clamps in one direction from the entrance port to the exit port, but not in the reverse direction.

12. A method for preventing debris from entering a line channel of a fixed-line trimmer head, the trimmer head having a housing operatively attachable to a rotary trimmer device, wherein the housing is rotatable when in use around a central axis of rotation and having a top surface extending outwardly from the central axis and facing upward when in use, a bottom surface extending outwardly from the central axis and facing the ground when in use, a periphery connecting the top surface to the bottom surface, the line channel being defined within the housing of the trimmer head having an entrance port recessed within the periphery, an actuator to adjust the fixed length of trimmer line and having at least one wall defining a slot of the actuator, a pair of opposed wall clamp comprising posts disposed within the slot of the actuator, wherein the posts are configured to slide within the slot perpendicularly to movement of the actuator, and an exit port disposed on one of the top and bottom surfaces, the method comprising:
- maintaining the entrance port and the exit port of the line channel such that both are located an equal distance from the axis of rotation,
- wherein the entrance port recessed within the periphery is defined by a wall extending from the top surface and from the bottom surface, the wall being located at the equal distance from the axis of rotation.

* * * * *